US011408782B2

United States Patent
Chen

(10) Patent No.: US 11,408,782 B2
(45) Date of Patent: Aug. 9, 2022

(54) INDOOR TEMPERATURE CONTROL SYSTEM

(71) Applicant: Ming-Tsung Chen, Taipei (TW)

(72) Inventor: Ming-Tsung Chen, Taipei (TW)

( * ) Notice: Subject to any disclaimer, the term of this patent is extended or adjusted under 35 U.S.C. 154(b) by 486 days.

(21) Appl. No.: 16/594,778

(22) Filed: Oct. 7, 2019

(65) Prior Publication Data

US 2020/0116575 A1  Apr. 16, 2020

(30) Foreign Application Priority Data

Oct. 11, 2018  (TW) .................................. 107135800

(51) Int. Cl.
| | | |
|---|---|---|
| *G01K 17/08* | (2006.01) | |
| *F24F 11/64* | (2018.01) | |
| *F24F 11/76* | (2018.01) | |
| *F24F 11/52* | (2018.01) | |
| *F24F 110/10* | (2018.01) | |

(52) U.S. Cl.
CPC .............. *G01K 17/08* (2013.01); *F24F 11/52* (2018.01); *F24F 11/64* (2018.01); *F24F 11/76* (2018.01); *F24F 2110/10* (2018.01)

(58) Field of Classification Search
CPC . G01K 17/08; F24F 11/52; F24F 11/64; F24F 11/76; F24F 2110/10; F24F 2110/30; F24F 1/0007; F24F 11/56; F24F 11/62; G05D 23/1931
See application file for complete search history.

(56) References Cited

U.S. PATENT DOCUMENTS

| | | | | |
|---|---|---|---|---|
| 2011/0220317 A1* | 9/2011 | Kidwell | .................. | F24T 10/17 165/287 |
| 2011/0238362 A1* | 9/2011 | Kidwell | .................. | F24T 10/17 702/182 |
| 2015/0041550 A1* | 2/2015 | Honda | ............... | G05D 23/1932 236/51 |
| 2017/0167740 A1* | 6/2017 | Yi | ............................ | F24F 11/83 |
| 2020/0116575 A1* | 4/2020 | Chen | ........................ | F24F 11/76 |

* cited by examiner

*Primary Examiner* — Ramesh B Patel

(74) *Attorney, Agent, or Firm* — Li & Cai Intellectual Property (USA) Office

(57) ABSTRACT

An indoor temperature control system includes a server, a first temperature sensor, a second temperature sensor, and a third temperature sensor. The server obtains a first heat adjustment amount according to a first temperature value of the first temperature sensor. The server obtains a second heat adjustment amount according to a second temperature value of the second temperature sensor. The server obtains a predetermined amount of heat of a predetermined region according to a third temperature value of the third temperature sensor. The server obtains a heat flow simulation diagram according to the first heat adjustment amount, the second heat adjustment amount, and the predetermined amount of heat. The server determines an operating time of an air conditioning device based on a target temperature, the second temperature value, and the heat flow simulation diagram.

4 Claims, 2 Drawing Sheets

INDOOR TEMPERATURE CONTROL SYSTEM

CROSS-REFERENCE TO RELATED PATENT APPLICATION

This application claims the benefit of priority to Taiwan Patent Application No. 107135800, filed on Oct. 11, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a temperature control system, and more particularly to a dynamic indoor temperature control system that allows for the entry of an external heat source.

BACKGROUND OF THE DISCLOSURE

Most conventional indoor temperature control systems use temperature sensors for constant temperature control. However, in a common household, if there is a gateway or window that communicates with the outside world, external heat (such as that from sunlight) is introduced into the room in the form of conduction or radiation, such that the conventional indoor temperature control systems cannot effectively and quickly cool down every part of the room.

Therefore, how to provide an indoor temperature control system that can quickly and effectively achieve a constant temperature in the room and that has an external heat introduction path is an important issue in the industry.

SUMMARY OF THE DISCLOSURE

In view of the above, the present disclosure provides an indoor temperature control system, disposed in a predetermined region which includes a first opening and an air conditioning device, the indoor temperature control system including: a server; a first temperature sensor communicatively connected to the server, disposed on one side of the first opening and configured to measure a first temperature value; a second temperature sensor communicatively connected to the server, disposed at an air outlet of the air conditioning device and configured to measure a second temperature value; and a third temperature sensor communicatively connected to the server, disposed at a central position of the predetermined region and configured to measure a third temperature value, where the server obtains a first heat adjustment amount according to the first temperature value of the first temperature sensor, obtains a second heat adjustment amount according to the second temperature value of the second temperature sensor, obtains a predetermined amount of heat of the predetermined region according to the third temperature value of the third temperature sensor, and obtains a heat flow simulation diagram according to the first heat adjustment amount, the second heat adjustment amount, and the predetermined amount of heat; where the server determines an operating time of the air conditioning device according to a target temperature, the second temperature value, and the heat flow simulation diagram.

The third temperature value is adjusted to a third adjustment temperature value according to the operating time of the air conditioning device, and the third adjustment temperature value is less than a temperature interval of the target temperature.

The indoor temperature control system further includes a first air velocity sensor communicatively connected to the server, disposed on one side of the first opening and configured to detect a first air velocity value near the first opening.

The indoor temperature control system further includes a second air velocity sensor communicatively connected to the server, disposed at the air outlet of the air conditioning device and configured to detect a second air velocity value of the air conditioning device.

The indoor temperature control system further includes a third air velocity sensor communicatively connected to the server, disposed at the central position and configured to detect a third air velocity value of the central position.

The server is communicatively connected to a control device, and the control device provides a control signal to the server for controlling operation of the air conditioning device.

The indoor temperature control system further includes at least one humidity sensor configured to measure a humidity value of the predetermined region.

In summary, the indoor temperature control system of the present disclosure detects different heat adjustment amounts and heat flow conditions with a plurality of temperature sensors and air velocity sensors, can effectively control the temperature in a predetermined region, and can accurately control the operating time of the air conditioning device since the heat adjustment conditions are known, to cool down or heat up the predetermined region, so that the costs associated with energy use can be effectively reduced.

The foregoing features and advantages of the present disclosure will become apparent from the following preferred embodiments below taken in conjunction with the following drawings below, and the detailed description is as follows.

DETAILED DESCRIPTION OF THE EXEMPLARY EMBODIMENTS

Figure 1:
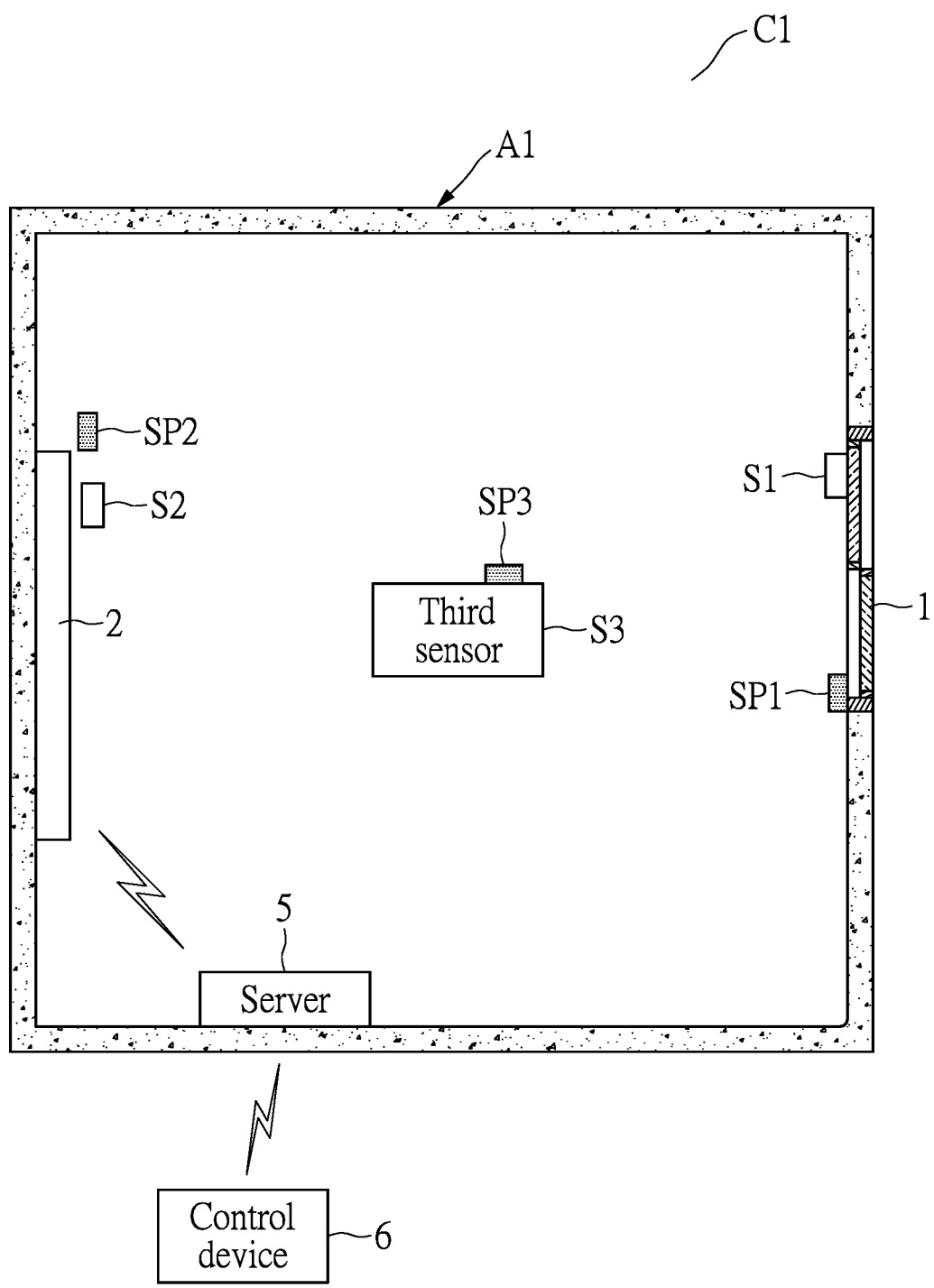
FIG. 1 is a schematic diagram of an indoor temperature control system according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

An indoor temperature control system will be described below in at least one embodiment with reference to the drawings. However, the following embodiments are not intended to limit the present disclosure. In the following description, an electronic element having two or more end points, if there are specific indicators for pins thereon, indicators are used for description thereof, and if there are no specific indicators, the left end point of an electronic element having two end points disposed horizontally is used as a first end, and the right end is used as a second end. For an electronic element having two end points disposed vertically, the upper end point is used as the first end, and the lower end point is used as the second end.

Figure 2:
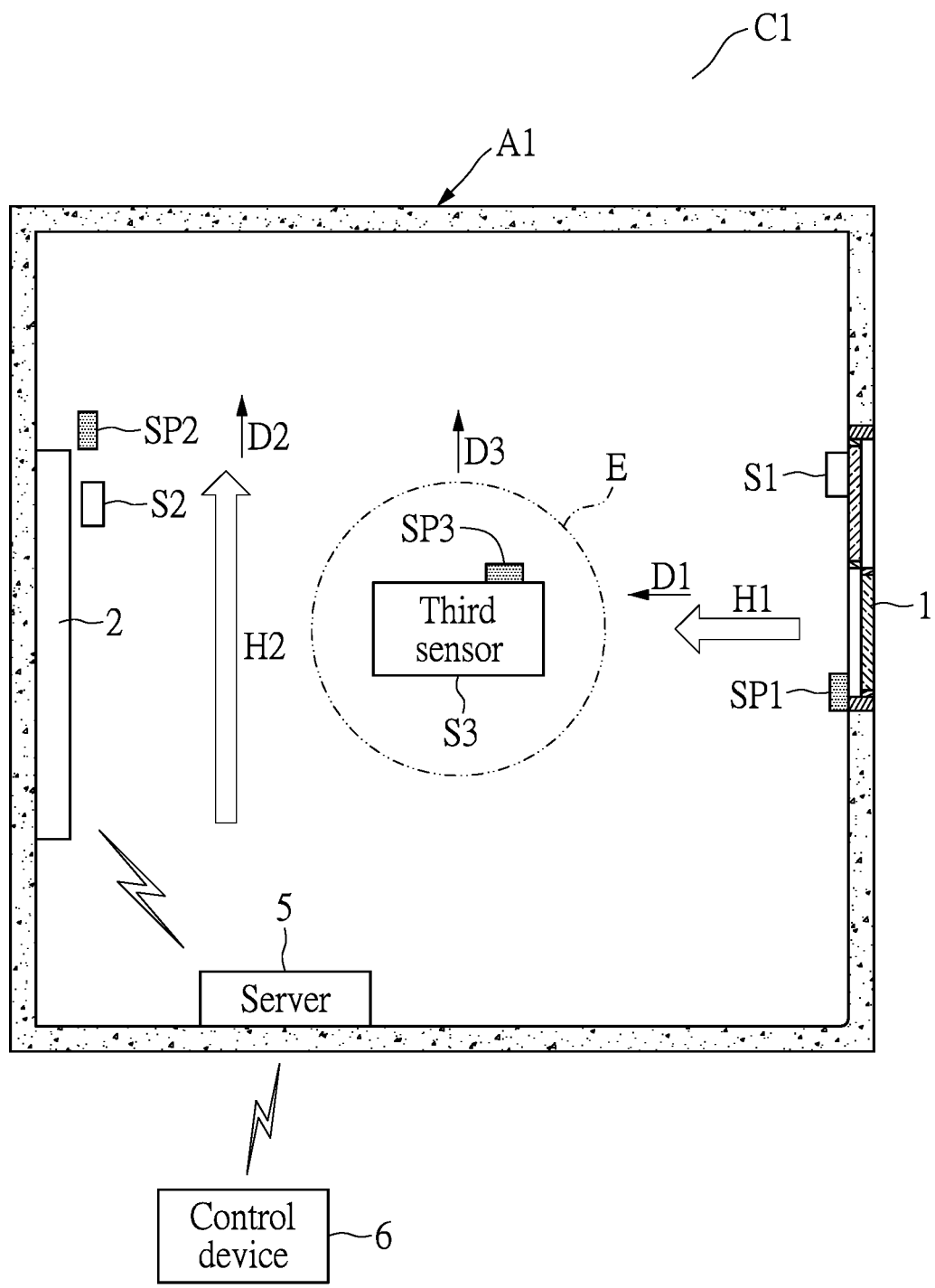
FIG. 2 is a schematic diagram of a heat flow balance simulation diagram in a predetermined region according to an embodiment of the present disclosure.

An Embodiment of an Indoor Temperature Control System of the Present Disclosure Referring to FIGS. 1 and 2, FIG. 1 is a schematic diagram of an indoor temperature control system according to an embodiment of the present disclosure, and FIG. 2 is a schematic diagram of a heat flow balance simulation diagram in a predetermined region according to an embodiment of the present disclosure.

Referring firstly to FIG. 1, in this embodiment, the indoor temperature control system C1 is disposed in a predetermined region A1. The predetermined region A1 includes a first opening 1 being in spatial communication with an external environment. In this embodiment, the first opening 1 is a window. In other embodiments, the first opening 1 includes a gateway, a skylight, and a heating device, which can be adjusted and designed according to actual needs, and are not limited in the present disclosure. In this embodiment, the predetermined region A1 may be a home, a school, a government office, or the like, and is not limited in the present disclosure.

In this embodiment, the first opening 1 faces the external environment and can receive sunlight or an external heat source. The predetermined region A1 further includes an air conditioning device 2.

The indoor temperature control system S1 includes a server 5, a first temperature sensor S1, a second temperature sensor S2, and a third temperature sensor S3.

The first temperature sensor S1 is communicatively connected to the server 5. The first temperature sensor S1 is disposed at one side of the first opening 1 for measuring a first temperature value. The second temperature sensor S2 is communicatively connected to the server 5. The second temperature sensor S2 is disposed at an air outlet (not shown) of the air conditioning device 2 for measuring a second temperature value. The third temperature sensor S3 is communicatively connected to the server 5, and the third temperature sensor is disposed at a central position (not shown) of the predetermined region A1 for measuring a third temperature value.

In this embodiment, the number of the first temperature sensor S1, the second temperature sensor S2, and the third temperature sensor S3 can be adjusted according to actual needs, and is not limited in the present disclosure. If a plurality of the first temperature sensors S1 of the same type is disposed in each access gateway, an average value thereof may be used for calculation, which may be adjusted according to actual needs, and is not limited in the present disclosure. Similarly, a plurality of second temperature sensors S2 and third temperature sensors S3 of the same type can also be calculated by using an average value calculation mode, which may be adjusted according to actual needs, and is not limited in the present disclosure.

The server 5 obtains a first heat adjustment amount H1 according to the first temperature value of the first temperature sensor S1. The server 5 obtains a second heat adjustment amount H2 according to the second temperature value of the second temperature sensor S2. The server 5 obtains a predetermined amount of heat E of the predetermined region A1 according to the third temperature value of the third temperature sensor S3. The server 5 obtains a heat flow simulation diagram according to the first heat adjustment amount H1, the second heat adjustment amount H2, and the predetermined amount of heat E. The server 5 determines an operating time of the air conditioning device 2 based on a target temperature, the second temperature value, and the heat flow simulation diagram.

In this embodiment, the heat of the predetermined region A1 can be obtained according to the following formula:

$$H=E+H1+H2 \qquad \text{(formula 1)}$$

where H is the amount of heat of the predetermined region A1, E is the current predetermined amount of heat of the predetermined region A1, H1 is the first heat adjustment amount, i.e., the external heat introduced through the first opening, and H2 is the second heat adjustment amount, i.e., the heat adjustment amount by which the air conditioning device 2 raises or lowers the temperature in the predetermined region A1.

In this embodiment, the first heat adjustment amount H1 and the second heat adjustment amount H2 each have a symbol of a positive sign when the first heat adjustment amount H1 and the second heat adjustment amount H2 are heat (temperature rise) introduced into the predetermined region A1. The first heat adjustment amount H1 and the second heat adjustment amount H2 each have a symbol of a negative sign when the first heat adjustment amount H1 and the second heat adjustment amount H2 are heat (temperature drop) exported from the predetermined region A1.

In this embodiment, the indoor temperature control system C1 further includes a first air velocity sensor SP1, a second air velocity sensor SP2, and a third air velocity sensor SP3.

The first air velocity sensor SP1 is disposed at one side of the first opening 1 for detecting an air flow direction and an air velocity which are affected by the external heat. That is, the first air velocity sensor SP1 detects a first air flow direction D1 and a first air velocity value AV2 in the vicinity of the first opening 1.

The second air velocity sensor SP2 is disposed in the vicinity of an air outlet (not shown) of the air conditioning device 2 for detecting the air flow direction and the air velocity of the air output by the air conditioning device 2. That is, the second air velocity sensor SP2 detects at least a second air flow direction D2 and a second air velocity value AV2 at the air outlet (not shown) of the air conditioning device 2.

The third air velocity sensor SP3 is disposed at a central position (not shown) of the predetermined region A1 for detecting the air flow direction and the air velocity at the central position of the predetermined region A1. That is, the third air velocity sensor SP3 detects at least a third air flow direction D3 and a third air velocity value AV3 at the central position (not shown).

The server 5 can determine a heat flow simulation diagram based on the first air flow direction D1, the first air velocity value AV1, the second air flow direction D2, the second air velocity value AV2, the third air flow direction D3, the third air velocity value AV3, the first heat adjustment amount H1, the second heat adjustment amount H2, and the predetermined amount of heat E.

In this embodiment, the first heat adjustment amount H1 and the second heat adjustment amount H2 are determined by the first temperature value, the first air velocity value AV1, the second temperature value and the second air velocity value AV2, respectively. For example, the second heat adjustment amount of the air conditioning device 2 can be calculated based on the second air velocity value AV2, the area size of the air outlet of the air conditioning device 2, and the amount of change of the second temperature value. That is, the second heat adjustment amount H2=the second air velocity value AV2* the area size of the air outlet of the air conditioning device 2*the amount of change of the second temperature value*the air density*the air specific heat. The area size of the air outlet of the air conditioning device 2, the air density, and the air specific heat are all known values. Therefore, the second heat adjustment amount H2 can be calculated. Similarly, the first heat adjustment amount H1 can also be obtained using a similar calculation process.

The server 5 can calculate the heat balance time of the predetermined region A1 to reach a target temperature according to the heat flow simulation diagram, and the air outlet direction and the air output amount of the air conditioning device 2 can be further adjusted to accelerate or slow down the heat balance time of the predetermined region A1 to reach the target temperature.

In this embodiment, the third temperature value is adjusted to a third adjustment temperature value according to the operating time of the air conditioning device 2, and the third adjustment temperature value is lower than or higher than a temperature interval of the target temperature. For example, if the third temperature is 27 degrees and the target temperature is 25 degrees, the air conditioning device 2 outputs cold air to lower the temperature of the predetermined region A1, and the third temperature gradually falls below the target temperature (25 degrees) to the third adjustment temperature, and will continue to drop to about 1 degree below the target temperature (25 degrees). That is, the absolute value of the target temperature minus the third adjustment temperature is less than 1 degree. On the contrary, the indoor temperature control system of this embodiment can also quickly raise the indoor temperature (third temperature value) to the target temperature.

In this embodiment, the indoor temperature control system C1 further includes a control device 6. The server 5 is communicatively connected to the control device 6. The control device 6 provides a control signal to the server 5 for controlling the operation of the air conditioning device 2. In this embodiment, the control device 6 transmits the control signal to the server 5 via a Bluetooth communication protocol. In other embodiments, the control device 6 can transmit the control signal via a LoRa communication protocol, a SigFox communication protocol, a Wireless Fidelity (WiFi) communication protocol, a Zigbee communication protocol, and a fourth-generation mobile communication technology protocol (4G), a fifth-generation mobile communication technology protocol (5G), and is not limited in the present disclosure.

In this embodiment, the control device 6 is a mobile phone, a tablet computer, or a wearable electronic device, but is not limited in the present disclosure.

In this embodiment, the indoor temperature control system C1 further includes at least one humidity sensor (not shown) for measuring a humidity value of the predetermined region A1.

Possible Effects of the Embodiments

In summary, the indoor temperature control system of the present disclosure detects different heat adjustment amounts and heat flow conditions with a plurality of temperature sensors and air velocity sensors, can effectively control the temperature in a predetermined region, and can accurately control the operating time of the air conditioning device since the heat adjustment conditions are known, to cool down or heat up the predetermined region, so that the costs of energy use can be effectively reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An indoor temperature control system, disposed in a predetermined region having a first opening and an air conditioning device, the indoor temperature control system comprising:
   a server;
   a first temperature sensor communicatively connected to the server, disposed on one side of the first opening and configured to measure a first temperature value, the first opening being in spatial communication with an external environment;
   a second temperature sensor communicatively connected to the server, disposed at an air outlet of the air conditioning device and configured to measure a second temperature value; and
   a third temperature sensor communicatively connected to the server, disposed at a central position of the predetermined region and configured to measure a third temperature value;

wherein the server obtains a first heat adjustment amount according to the first temperature value of the first temperature sensor, obtains a second heat adjustment amount according to the second temperature value of the second temperature sensor, obtains a predetermined amount of heat of the predetermined region according to the third temperature value of the third temperature sensor, and obtains a heat flow simulation diagram according to the first heat adjustment amount, the second heat adjustment amount, and the predetermined amount of heat;

wherein the server determines an operating time of the air conditioning device according to a target temperature, the first temperature value, the second temperature value, the third temperature value, and the heat flow simulation diagram.

2. The indoor temperature control system according to claim 1, wherein the third temperature value is adjusted to a third adjustment temperature value according to the operating time of the air conditioning device, the third adjustment temperature value is less than a temperature interval of the target temperature, the server is communicatively connected to a control device, and the control device provides a control signal to the server for controlling operation of the air conditioning device.

3. The indoor temperature control system according to claim 2, further comprising:
 a second air velocity sensor communicatively connected to the server, disposed at the air outlet of the air conditioning device and configured to detect a second air velocity value of the air conditioning device;
 a third air velocity sensor communicatively connected to the server, disposed at the central position and configured to detect a third air velocity value of the central position; and
 at least one humidity sensor configured to measure a humidity value of the predetermined region.

4. The indoor temperature control system according to claim 1, further comprising:
 a first air velocity sensor communicatively connected to the server, disposed on one side of the first opening and configured to detect a first air velocity value near the first opening.

* * * * *